Figure 1:
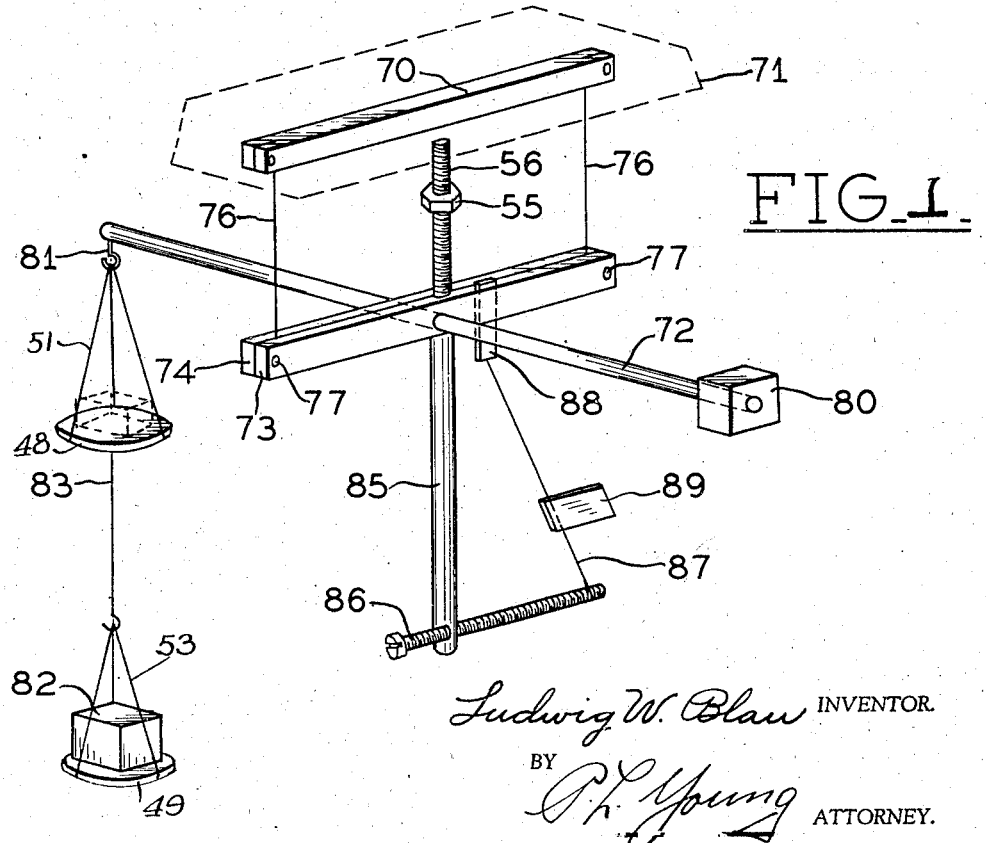

Sept. 22, 1942.  L. W. BLAU  2,296,330
GRAVITY BALANCE
Original Filed Aug. 29, 1935   2 Sheets-Sheet 1

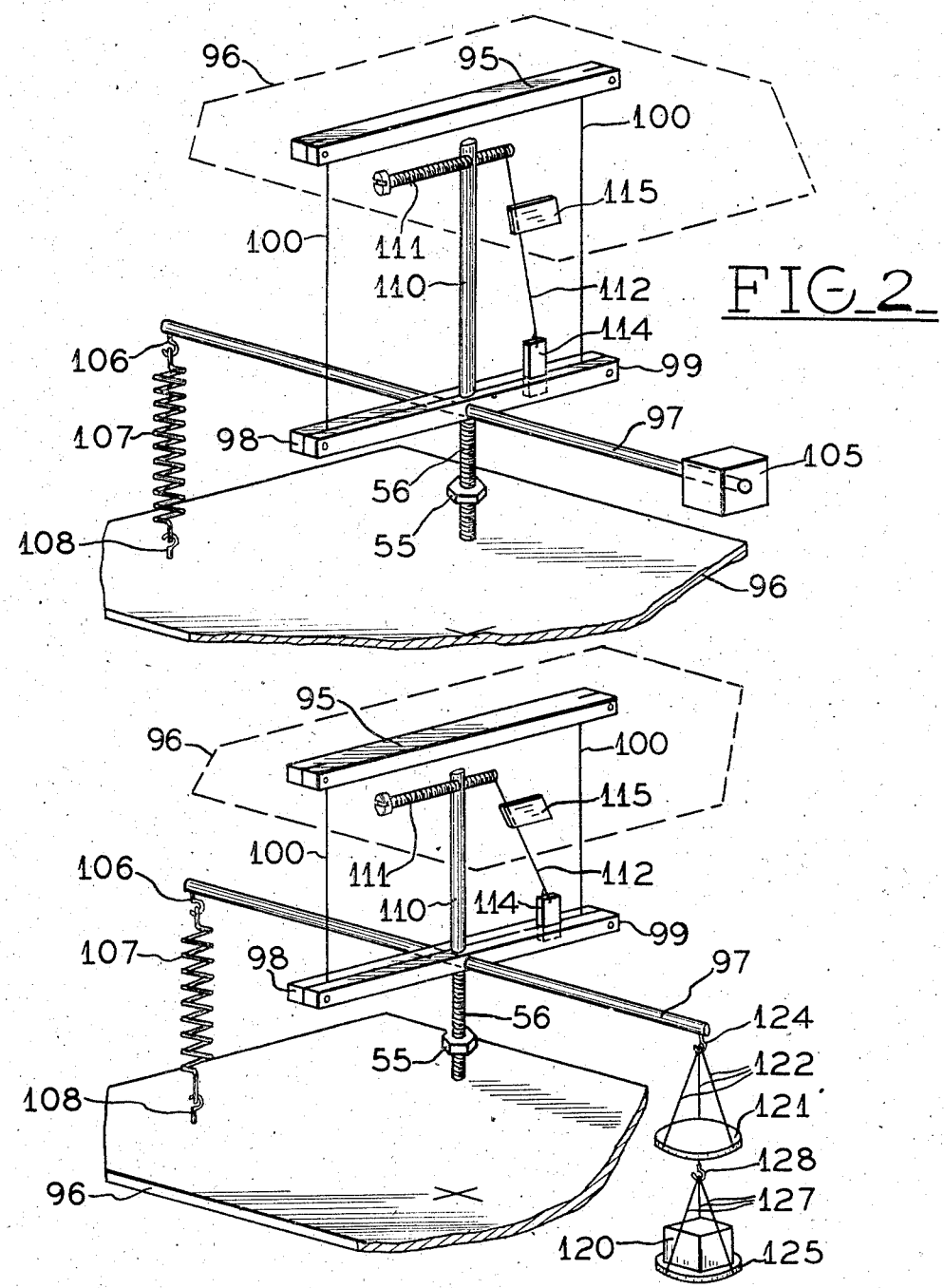

Patented Sept. 22, 1942

2,296,330

UNITED STATES PATENT OFFICE 2,296,330

GRAVITY BALANCE

Ludwig W. Blau, Houston, Tex., assignor to Standard Oil Development Company, a corporation of Delaware Original application August 29, 1935, Serial No. 38,350. Divided and this application February 3, 1938, Serial No. 188,437

10 Claims. (Cl. 265—1.4)

This invention relates to improvements in a gravity balance. This application is a division of my copending application Serial No. 38,350, filed August 29, 1935.

The object of the present invention is the provision of a gravity meter of simple rugged construction and of increased sensitivity.

Further objects and advantages of the present invention will appear from the accompanying drawings in which—

Figure 1 is a perspective view of an improved gravity balance free to operate in a vertical plane, having means for magnifying the deflection of the gravity balance and an alternative construction for altering the vertical position of the balanced weights;

Figure 2 is a perspective view of another form of gravity balance provided with a torsional horizontal pendulum and utilizing a helical spring at one end of the balance beam; and Figure 3 is a perspective view of a gravity balance comprising a torsional horizontal pendulum and utilizing a helical spring at one end of the balance beam and a weight adapted to be suspended at varying distances vertically from the other end of the balance beam.

Referring to Figure 1, a modified form of vertical balance is illustrated. The device comprises a bar 70 which may be secured rigidly to the top 71 of the case of the instrument. The moving system of the instrument comprises a balance beam 72 having arms protruding horizontally from an intermediate portion of the beam. The arms are formed by two abutting pieces 73 and 74 having an opening in their mid-sections to receive an intermediate portion of the balance beam. Filaments 76, which in the embodiment illustrated are wires, are connected to the arms from opposite ends of the bar 70 to suspend the beam 72 at right angles to the bar 70. The filaments 76 are gripped between pieces 73 and 74 which are held together by means of pins 77. The balance beam 72 carries a weight 80 affixed directly to one of its ends and has at its other end a hook 81 adapted for suspending a weight 82 at various heights. In the embodiment illustrated a scale pan 48 is suspended by wires 51 directly near the end of the balance beam by means of hook 81. A second scale pan 49 is suspended beneath the scale pan 48 by means of a filament 83 attached directly to hook 81. Preferably, the scale pan 49 is disposed approximately 50 cm. below the scale pan 48. In operation of the device readings are taken with the weight 82 supported by the scale pans 49 and 48 successively. Alternatively, scale pan 49 can be suspended by a suitable hook attached directly to the bottom of scale pan 48.

A reading of the deflection of the balance can be magnified as follows. A bracket 85 depends downwardly from an intermediate portion of the pieces 73 and 74. The lower portion of the bracket 85 is provided with a laterally extending portion, such as the adjusting screw 86, which is threaded through an opening in the lower end of the bracket 85. A filament, such as a wire or metallic ribbon 87, is strung from the free end of the screw 86 to a support 88 carried by one of the beam arms. In the embodiment illustrated, the support 88 is clamped between the pieces 73 and 74. The filament 87 is connected to the support 88 at a point near the upper end of the bracket 85. A mirror 89 is supported by the filament 87 with the plane of its reflecting surface operative with the longitudinal axis of the filament. In reading the deflections of the beam, a beam of light is reflected from the mirror 89, as has been previously described. The mirror 89 is deflected through an angle greater than the angle through which the beam 72 is deflected, thus providing a magnification of the angle of deflection of the beam 72. This magnification can be increased at will by adjusting the positioning screw 86. The smaller the angle between the filament 87 and a line parallel to the bracket 85 through the point 88, the greater the magnification.

The system 85 to 89 inclusive constitutes a torsional horizontal pendulum which functions to increase the sensitivity of the balance. It will be understood that the torsional horizontal pendulum can be caused to protrude upwardly from the balance beam and some of the advantages of the invention will be retained. This arrangement of parts will be described in connection with Figure 2. In such a case the screw 56 and weight 55 used for adjusting the center of gravity of the system vertically depend from the under surface of the balance beam 72.

The two series of readings taken with the weight at one end of the balance beam in alternate high and low positions yield complete data about the gravitational field at the place of observation. However, one series of readings with the weight in one position only with respect to the end of the balance beam can be made and some of the advantages of the invention will be retained, in that satisfactory data will be obtained. The readings can be taken with the weight disposed either in its uppermost position, as illustrated in dotted lines, or in the lower position, as illustrated in full lines. Alternatively, the weight can be secured directly on the balance beam.

Referring particularly to Figure 2, a modified form of the invention is shown comprising a bar 95 which may be secured rigidly to the top of the case 96 of the instrument. The moving system of the instrument comprises a balance beam 97 having arms 98 and 99 protruding horizontally from an intermediate portion of the beam. Filaments 100 are connected to the arms 98 and 99 from opposite ends of the bar 95 to suspend the beam 97 at right angles to the bar 95. A weight 105 is secured directly to one end of the beam 97. The opposite end of the beam 97 carries a hook 106 to which is secured a helical spring 107. The spring 107 depends from the hook 106 and is secured at its bottom end 108 to the bottom of the frame 96 of the instrument. The helical spring 107 is used as a substitute for a lower weight in the operation of the device. The spring 107 permits the operator to obtain relative gravity values at different stations.

A torsional horizontal pendulum is mounted on top of the balance beam 97. The horizontal pendulum comprises a bracket 110 which protrudes upwardly from the beam 97 at the junction of the arms 98 and 99. The upper end of the bracket 110 is provided with a laterally extending portion, such as the adjusting screw 111, which is threaded through an opening in the upper end of the bracket 110. A filament 112, such as a wire or metallic ribbon, is strung from the free end of the screw 111 to a support 114 carried by the arm 99. The filament 112 is connected to the support 114 at a point near the lower end of the bracket 110. A mirror 115 is supported by the filament 112 with the plane of its reflecting surface operative with the longitudinal axis of the filament. The center of gravity of the system is adjusted vertically by adjusting the vertical position of the weight 55 threaded upon the screw 56 depending from the under surface of the intermediate portion of the balance beam.

Referring to Figure 3, a form of the invention is illustrated which is identical with the structure shown in Figure 2, except that the fixed weight 105 is replaced by a weight which is adjustable vertically. The vertically adjustable weight 120 may be supported by means of a scale pan 121 which is suspended by filaments 122 directly near the end of the balance beam 97 by means of a hook 124. A second scale pan 125 is suspended beneath the scale pan 121 by means of a filament 127 attached to a hook 128 carried by the scale pan 121. A helical spring 107 depends downwardly from the opposite end of the beam 97, and is secured at 108 to the frame 96 of the instrument. The remaining structure of the device of Figure 3 is identical with that illustrated in Figure 2, and like reference numerals have been applied to like parts. In the operation of the device a plurality of readings are taken with the weight 120 in its upper and lower positions, as has been previously described in connection with the description of Figure 1. Balances such as are shown in Figures 1, 2 and 3, which are suspended by a plurality of filaments, will give the vertical component of the gravity gradient and can be used in conjunction with an ordinary torsion balance to obtain all of the gravitational quantities.

Various changes and alternate arrangements may be made within the scope of the appended claims, in which it is my intention to claim all novelty inherent in the art as broadly as the prior art permits.

I claim:

1. In a gravity balance, a horizontally disposed bar, a beam having arms protruding horizontally from an intermediate portion of the beam, filaments connected to the arms from opposite ends of the bar to suspend the beam at right angles to the bar, a weight supported directly by one end of the beam, a second weight, means suspending the second weight from the opposite end of the beam, a bracket extending vertically from an intermediate portion of the beam and having a laterally extending portion, a filament extending from the portion to one of the arms, and a horizontal pendulum in the form of a mirror carried by the filament.

2. In a gravity balance, a horizontally disposed bar, a beam having arms protruding horizontally from an intermediate portion of the beam, filaments connected to the arms from opposite ends of the bar to suspend the beam at right angles to the bar, a weight supported directly by one end of the beam, a second weight, means suspending the second weight from the opposite end of the beam, and a torsional horizontal pendulum including a bracket protruding vertically from an intermediate portion of the beam having a laterally extending portion, a filament extending from the portion to one of the arms, and a mirror carried by the filament.

3. A gravity balance, comprising a support, a beam assembly, spaced filaments suspending the beam assembly with the beam in horizontal position at substantially right angles to the support, means for applying forces to the beam to oscillate the beam assembly, and a torsional horizontal pendulum extending from an intermediate portion of the beam whereby oscillation of the assembly is amplified.

4. A gravity balance, comprising a horizontally disposed bar, a beam assembly, filaments spaced longitudinally of the bar connected to laterally spaced portions of an intermediate section of the beam assembly suspending the assembly from the bar, means for applying forces to the beam to oscillate the beam assembly, and a torsional horizontal pendulum depending from an intermediate portion of the beam whereby oscillation of the assembly is amplified.

5. In a gravity balance a horizontally disposed bar, a beam having arms projecting horizontally from an intermediate portion of the beam, filaments connecting to the arms from the opposite ends of the bar to suspend the beam at right angles to the bar, means for applying forces to the beam, a bracket protruding vertically from an intermediate portion of the beam and having a laterally extending portion, a filament extending from the portion to one of the arms and a horizontal pendulum in the form of a mirror carried by the filament.

6. An apparatus as in claim 5 in which the means for applying forces to the beam comprise a weight supported directly by one end of the beam and a helical spring depending from said other end of the beam and secured to a fixed support.

7. An apparatus as in claim 5 in which the bracket extends upwardly.

8. An apparatus in accordance with claim 3 in which the horizontal pendulum extends upwardly from the beam.

9. An apparatus in accordance with claim 3 in which the means for applying forces to the beam comprises a weight supported directly by one end of the beam and a helical spring depending from the other end of said beam and secured to a fixed support.

10. An apparatus in accordance with claim 3 in which said means for applying forces to the beam comprise a weight supported directly by one end of the beam and a second weight with means suspending the second weight from the opposite end of the beam.

LUDWIG W. BLAU.